Jan. 12, 1960 C. W. KANDLE 2,920,878
TUNNELING MACHINE CLEAN-UP APPARATUS
Filed May 7, 1958
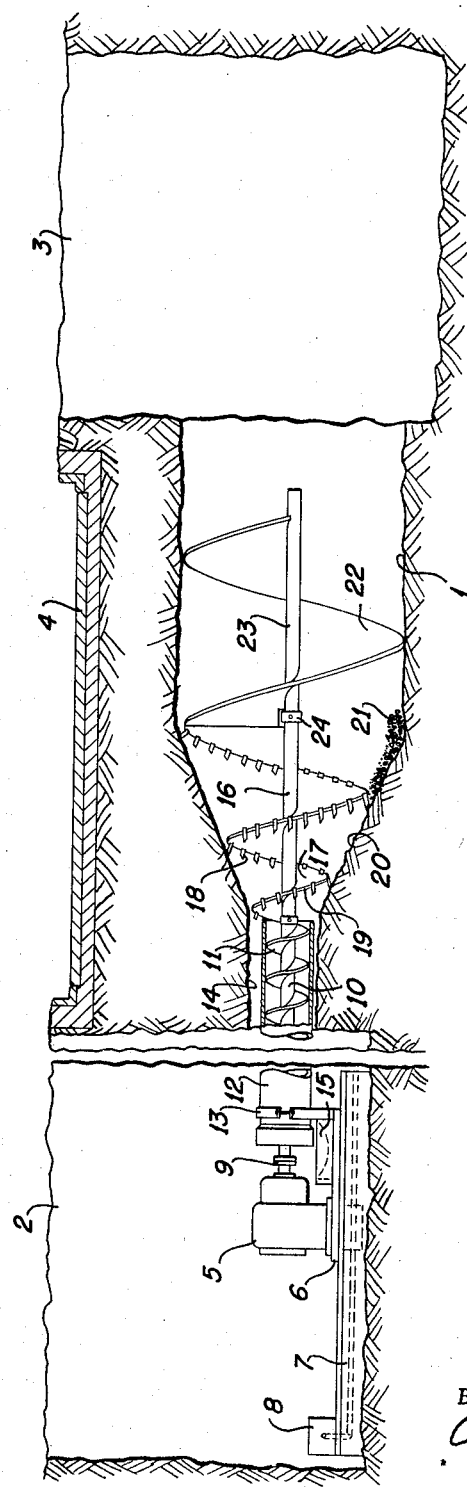
INVENTOR.
CHARLES W. KANDLE
BY
Andrus & Starke
ATTORNEYS

United States Patent Office 2,920,878
Patented Jan. 12, 1960

2,920,878

TUNNELING MACHINE CLEAN-UP APPARATUS

Charles W. Kandle, La Grange Park, Ill.

Application May 7, 1958, Serial No. 733,630

4 Claims. (Cl. 262—7)

This invention relates to a tunneling machine clean-up apparatus, and more particularly to a back-feed apparatus utilized in conjunction with a tunnel cutter to remove spoil that may not have been picked up by the cutter.

The invention is an improvement over the machine disclosed in my Patent No. 2,839,271, issued June 17, 1958, and entitled "Tunneling Machine."

In the above-identified patent, a tapered spiral cutter is rotatably connected through a spiral conveyor of relatively smaller diameter to a driving motor. The taper of the spiral cutter is such that as it is pulled through a previously bored smaller hole in the earth, the hole is enlarged and the spoil therefrom is fed back through the spiral conveyor (and in the direction of movement of the entire apparatus) for discharge adjacent the motor.

It has been desirable to produce a relatively clean tunnel wall with a spiral cutter, but occasionally, due to certain types of earth and other factors some cut spoil remains behind in the tunnel.

The present invention solves the aforementioned problem and provides a clean-up means which follows directly behind the tapered cutter and feeds any remaining spoil into the cutter spiral.

The accompanying drawing illustrates the best mode presently contemplated by the inventor for carrying out the invention.

The single figure of the drawing is a vertical section taken through the earth and showing the apparatus proceeding to the left to cut a relatively large tunnel.

As shown in the drawing, the invention may be utilized to horizontally bore a tunnel 1 of relatively large diameter between two large openings, 2 and 3, in the earth, and beneath a roadway 4 or the like. The apparatus comprises a motor 5 mounted on a suitable carriage 6 in opening 2. A track 7 is provided on the floor of opening 2 and is associated with a suitable power means 8, shown diagrammatically, for moving carriage 6 longitudinally in either direction along track 7.

The rotatable shaft of motor 5 is coupled at 9 to the central hub 10 of an auger conveyor 11 having blades of substantially constant maximum diameter throughout the length of the conveyor. Auger 11 is confined by a cylindrical casing 12 which is fixedly mounted on a bracket member 13, the latter being secured to carriage 6 in any suitable manner.

The auger-casing assembly is adapted to be disposed in a horizontal bore 14 of reduced diameter which is initially cut between openings 2 and 3, as set forth in my above-identified patent, and conducts spoil therethrough until it falls onto a chute 15 on carriage 6 and is diverted to any suitable location.

The right end portion of hub 10 is suitably coupled to the central hub portion 16 of a tapered spiral cutting head having a tapered auger 17 with a plurality of cutting members 18 spaced along the spiral edge 19 thereof. At least a portion of each cutter 18 extends radially outwardly from edge 19.

As explained in my above identified patent, as motor 5 rotates augers 11 and 17, the apparatus is simultaneously moved to the left by drive mechanism 8 and the tapered spiral cutter gradually enlarges the initial bore 14 to the desired size of tunnel 1, the portion 20 being cut assuming a conical shape. The spoil removed from the earth by cutters 18 is fed directly into auger 17 which has a flight such that the spoil is fed in the direction of apparatus movement and into the reduced auger conveyor 11, which in turn feeds the spoil through casing 12 to chute 15.

Since cutters 18 extend radially beyond auger 17, the edge 19 is of slightly less radial extent than the wall of cone 20 or tunnel 1, at any given point along the tunnel. Under some conditions, this makes it possible for a small amount of spoil to occasionally penetrate the spaces between the adjacent cutters 18 and bounded by edge 19 and the tunnel wall, and subsequently remain in tunnel 1 behind the spiral cutting head, as indicated at 21. This is particularly true adjacent the larger end of the cutter.

Since excess spoil is often highly undesirable, a means is provided which bears against the tunnel wall and cleans up the remaining excess on any circumferential portion of the wall. This means comprises a spiral back-feed auger 22 of a constant maximum diameter throughout its length and disposed for clean-up rotation in tunnel 1. The edge of auger 22 approaches the wall of tunnel 1 much closer than does the edge 19 of auger 17 so that substantially no spoil can be bypassed thereby as the clean-up auger follows the tapered cutter. Auger 22 also assists the spiral cutter in maintaining grade.

The hub 23 of auger 22 is secured to the outer end of hub 16 by a suitable universal joint 24 whereby both augers are rotatably driven together by motor 5. The universal nature of joint 24 permits use of the right end of hub 23 to pull a pipe casing, not shown, through the tunnel. The radial edge of the large end portion of auger 17 should closely approach the similar radial edge of the inner end of auger 22 to produce a substantially continuous spiral. Alternatively, the two radial edges may be fixedly joined by a seam weld or the like.

The pitch of auger 22 is similar to that of augers 11 and 17, whereby as the apparatus is drawn leftward, auger 22 picks up or shears off any excess spoil 21 anywhere on the circumference of the wall and feeds it back into auger 17 and hence to auger 11. If any spoil is again bypassed by the cutter, it will again be picked up by auger 22 and fed back into the cutter.

The invention provides a novel apparatus which picks up spoil left behind by a spiral cutter of tapered or other configuration and feeds it back in the direction of cutting action and into the cutter for subsequent disposition at the forward cutting end. The cutter drive also simultaneously operates the clean-up apparatus, no separate drive or pick-up conveyor being needed at the free end of the clean-up apparatus.

Various modes of carrying out the invention are contemplated as being within the scope of the following claims particularly pointing out and distinctly claiming the subject matter which is regarded as the invention.

I claim:

1. In a machine for forming a bore in the earth and having a cutter adapted for boring operations in one direction whereby spoil is fed in the same direction from the cutter to a conveyor for subsequent discharge ahead of the cutter, spiral shearing and clean-up means disposed behind the cutter and connected thereto for following the latter in the bore formed thereby, said clean-up means bearing against the wall of the bore and shearing excess spoil from said wall and feeding the spoil bypassed by the cutter back into the cutter and in said same direction, and means to rotatably drive said cutter and clean-up means simultaneously.

2. In a tunneling machine having drive means and having a cutter rotatably driven thereby and adapted for boring operations whereby spoil is fed from the forward end of the cutter into a conveyor for discharge, spiral means of constant maximum diameter throughout its length disposed behind said cutter and bearing against the wall of the tunnel formed thereby to feed spoil bypassed by the cutter back into the cutter for subsequent feeding to the conveyor, and means connecting said last-named means with said drive means for simultaneous operation with said cutting means.

3. In a machine for forming a bore in the earth, a rotatable cutter adapted for boring operations in one direction, a rotatable auger conveyor connected to the forward end of the cutter and adapted to receive spoil therefrom and convey the spoil in the same direction for discharge ahead of the cutter, rotatable spiral cutting and clean-up means disposed behind the cutter and connected thereto for following the latter in the bore formed thereby, said spiral means being adapted to bear against the wall of the bore to cut excess earth therefrom and feed spoil bypassed by said cutter in said same direction and back into said cutter, and means to rotatably drive said cutter, conveyor and clean-up means simultaneously.

4. A machine for forming a bore in the earth, comprising rotatable drive means disposed for longitudinal movement relative to the bore to be formed, an auger conveyor rotatably secured at one end to said drive means, a tapered spiral auger connected at its reduced end to the other end of said auger conveyor for rotation therewith, a plurality of spaced cutters disposed on the edge of said tapered auger for cutting contact with the earth whereby the spoil cut therefrom enters said tapered auger and is fed therethrough in the direction of cutting movement and into said auger conveyor for subsequent discharge ahead of the tapered auger, and a clean-up auger disposed to follow behind the tapered auger in the formed bore and closely abutting the tapered auger to form a substantially continuous spiral, the diameter of the clean-up auger being substantially the same as that of the formed bore to shear excess spoil therefrom.

References Cited in the file of this patent

UNITED STATES PATENTS 2,775,439    McCarthy ------------ Dec. 25, 1956